United States Patent
Shah et al.

(10) Patent No.: US 6,938,018 B2
(45) Date of Patent: *Aug. 30, 2005

(54) METHOD AND APPARATUS FOR A MODULAR POSTAGE ACCOUNTING SYSTEM

(75) Inventors: Chandrakant J. Shah, Stockton, CA (US); Keith B. Robertson, Castro Valley, CA (US)

(73) Assignee: Neopost Inc., Hayward, CA (US)

( * ) Notice: Subject to any disclaimer, the term of this patent is extended or adjusted under 35 U.S.C. 154(b) by 213 days.

This patent is subject to a terminal disclaimer.

(21) Appl. No.: 09/768,938

(22) Filed: Jan. 23, 2001

(65) Prior Publication Data

US 2001/0020234 A1 Sep. 6, 2001

Related U.S. Application Data

(63) Continuation of application No. 09/012,037, filed on Jan. 22, 1998, now Pat. No. 6,240,403, which is a continuation of application No. 08/562,268, filed on Nov. 22, 1995, now Pat. No. 5,822,738.

(51) Int. Cl.[7] .............................................. G06F 17/00
(52) U.S. Cl. ........................................ 705/62; 705/408
(58) Field of Search .............................. 705/62, 60, 61, 705/401, 408

(56) References Cited

U.S. PATENT DOCUMENTS

| | | |
|---|---|---|
| 3,652,795 A | 3/1972 | Wolf et al. |
| 3,792,446 A | 2/1974 | McFiggins et al. |
| 3,890,599 A | 6/1975 | Simjian |
| 3,938,095 A | 2/1976 | Check, Jr. et al. |
| 3,978,457 A | 8/1976 | Check, Jr. et al. |

(Continued)

FOREIGN PATENT DOCUMENTS

| | | |
|---|---|---|
| EP | 825 565 A2 | 2/1998 |
| EP | 845 762 A2 | 6/1998 |
| EP | 927 960 A2 | 7/1999 |
| GB | 1 536 403 | 12/1978 |
| WO | WO 98/13790 A1 | 4/1998 |
| WO | WO 98/20461 A2 | 5/1998 |
| WO | WO 00/49580 A1 | 8/2000 |

OTHER PUBLICATIONS

"Information–Based Indicia Program (IBIP), Performance Criteria for Information–Based Indicia and Security Architecture for Closed IBI Postage Metering Systems (PCIBI–C)" Jan. 12, 1999, United States Postal Service, dated Jan. 12, 1999.

"Information Based Indicia Program (IBIP) Indicium Specification," United States Postal Service, dated Jun. 13, 1996.

Information Based Indicia Program Postal Secuirty Device Specification, United States Postal Service, dated Jun. 13, 1996.

"Information Based Indicia Program Host System Specification [Draft]," United States Postal Service, dated Oct. 9, 1996.

(Continued)

*Primary Examiner*—Thomas A. Dixon
(74) *Attorney, Agent, or Firm*—Townsend and Townsend and Crew LLP

(57) ABSTRACT

Apparatus and method for a modular postage accounting system. An open system metering device of the present invention includes a general purpose computer, a digital printer and a secure metering device (SMD). The SMD performs the accounting functions of a postage meter and generates encrypted postage indicia data for transmission by the computer to the digital printer and subsequent printing on a mailpiece by the digital printer. Postage credit data can be entered into the SMD using a computerized meter resetting system just as it is in a conventional postage meter.

19 Claims, 10 Drawing Sheets

U.S. PATENT DOCUMENTS

| | | |
|---|---|---|
| 3,990,558 A | 11/1976 | Ehrat |
| 4,097,923 A | 6/1978 | Eckert, Jr. et al. |
| 4,122,532 A | 10/1978 | Dlugos et al. |
| 4,168,533 A | 9/1979 | Schwartz |
| 4,252,537 A | 2/1981 | Cattran et al. |
| 4,253,158 A | 2/1981 | McFiggans |
| 4,319,328 A | 3/1982 | Eggert |
| 4,376,299 A | 3/1983 | Rivest |
| 4,447,890 A | 5/1984 | Duwel et al. |
| 4,484,307 A | 11/1984 | Quatse et al. |
| 4,547,853 A | 10/1985 | Eckert |
| 4,569,022 A | 2/1986 | Coppola et al. |
| 4,574,352 A | 3/1986 | Coppola et al. |
| 4,629,871 A | 12/1986 | Scribner et al. |
| 4,649,266 A | 3/1987 | Eckert |
| 4,657,697 A | 4/1987 | Chiang |
| 4,725,718 A | 2/1988 | Sansone et al. |
| 4,743,747 A | 5/1988 | Fougere et al. |
| 4,752,950 A | 6/1988 | Le Carpentier |
| 4,757,537 A | 7/1988 | Edelmann et al. |
| 4,760,532 A | 7/1988 | Sansone et al. |
| 4,760,534 A | 7/1988 | Fougere et al. |
| 4,775,246 A | 10/1988 | Edelmann et al. |
| 4,796,193 A | 1/1989 | Pitchenik |
| 4,809,185 A | 2/1989 | Talmadge |
| 4,812,994 A | 3/1989 | Taylor et al. |
| 4,813,912 A | 3/1989 | Chickneas et al. |
| 4,831,555 A | 5/1989 | Sansone et al. |
| 4,837,701 A | 6/1989 | Sansone et al. |
| 4,853,865 A | 8/1989 | Sansone et al. |
| 4,853,961 A | 8/1989 | Pastor |
| 4,858,138 A | 8/1989 | Talmadge |
| 4,868,757 A | 9/1989 | Gil |
| 4,887,204 A | 12/1989 | Johnson et al. |
| 4,901,241 A | 2/1990 | Schneck |
| 4,908,770 A | 3/1990 | Breault et al. |
| 4,949,381 A | 8/1990 | Pastor |
| 4,980,542 A | 12/1990 | Jackson et al. |
| 5,029,093 A | 7/1991 | Wiener |
| 5,077,792 A | 12/1991 | Herring |
| 5,142,577 A | 8/1992 | Pastor |
| 5,181,245 A | 1/1993 | Jones |
| 5,202,834 A | 4/1993 | Gilham |
| 5,224,046 A | 6/1993 | Kim et al. |
| 5,231,668 A | 7/1993 | Kravitz |
| 5,243,654 A | 9/1993 | Hunter |
| 5,280,531 A | 1/1994 | Hunter |
| 5,309,363 A | 5/1994 | Graves et al. |
| 5,319,562 A | 6/1994 | Whitehouse |
| 5,341,505 A | 8/1994 | Whitehouse |
| 5,367,464 A | 11/1994 | Abumehdi et al. |
| 5,375,172 A | 12/1994 | Chrosny |
| 5,377,268 A | 12/1994 | Hunter |
| 5,448,641 A | 9/1995 | Pintsov et al. |
| 5,480,239 A | 1/1996 | Kim et al. |
| 5,510,992 A | 4/1996 | Kara ..................... 705/408 |
| 5,539,190 A | 7/1996 | Manduley |
| 5,583,779 A | 12/1996 | Naclerio et al. |
| 5,606,507 A | 2/1997 | Kara |
| 5,625,694 A | 4/1997 | Lee et al. |
| 5,638,442 A | 6/1997 | Gargiulo et al. |
| 5,666,421 A | 9/1997 | Pastor et al. |
| 5,688,056 A | 11/1997 | Peyret |
| 5,715,164 A | 2/1998 | Liechti et al. |
| 5,742,683 A | 4/1998 | Lee et al. |
| 5,758,345 A | 5/1998 | Wang |
| 5,781,438 A | 7/1998 | Lee et al. |
| 5,793,867 A | 8/1998 | Cordery et al. |
| 5,822,738 A | 10/1998 | Shah et al. |
| 5,918,234 A | 6/1999 | Shah et al. |
| 5,920,850 A | 7/1999 | Hunter et al. |
| 5,963,928 A | 10/1999 | Lee |

OTHER PUBLICATIONS

"Information–Based Indicia Program (IBIP), Performance Criteria for Information–Based Indicia and Security Architecture for IBI Postage Metering Systems (PCIBISAIBI-PMS)," United States Postal Service, dated Aug. 19, 1998.

United States Postal Service, "Performance Criteria For Information–Based Indicia And Security Architecture For Open IBI Postage Evidencing Systems," Information Based Indicia Program (IBIP), Jun. 25, 1999 XP–002161216.

Barker–Benfield, "First Union Offers Online Transactions," *Florida Times–Union*, Jan. 28, 1994.

FIBS PUB 140–1, Federal Information Processing Standards Publication, (Jan. 11, 1994) Security Requirements for Cryptographic Modules, U.S. Department of Commerce, Ronald H. Brown, Secretary, National Institute of Standards and Technology; pp: 1–51.

Weaver, P., "Applying Postage with a Keystroke," *Nations Business*, 85(12):56, DialogWeb copy pp. 1–3 (1997).

METHOD AND APPARATUS FOR A MODULAR POSTAGE ACCOUNTING SYSTEM

CROSS REFERENCE TO RELATED APPLICATIONS

This application is a continuation application of and claims priority to U.S. patent application Ser. No. 09/012,037 (U.S. Pat. No. 6,240,430), filed on Jan. 22, 1998, which is in turn a continuation application of U.S. patent application Ser. No. 08/562,268 filed Nov. 22, 1995 (U.S. Pat. No. 5,822,738), which are both incorporated by reference in their entirety for all purposes. The following commonly owned patents, U.S. Pat. Nos. 5,778,066 and 5,918,234, are incorporated by reference in their entirety for all purposes.

BACKGROUND OF THE INVENTION

The present invention relates generally to a method and apparatus for a modular postage accounting system. More specifically, the present invention allows the printing of postage using any computer having the proper communications and printing capabilities.

Historically, postage meters have been dedicated, stand-alone devices, capable only of printing postage indicia on envelopes (or labels, in the case of parcels). These devices resided at a user site and could provide postage metering for that site alone. Such postage meters required the user to physically transport the device to a post office for resetting (increasing the amount of postage contained in the meter). An advance over this system was the ability to allow users to reset their meters via codes, provided by either the manufacturer or the postal authority once payment by the customer had been made. In contrast, modern electronic meters are often capable of being reset directly by an authorized party, on-site (at the user's location) via a communications link. A system which performs meter resetting in this manner is known as a Computerized Meter Resetting System (or "CMRS"). The party having authority to reset the meter and charge the customer (usually the manufacturer or the postal authority) thus gains access to and resets the meter.

Postage meters are still, unfortunately, restricted to use at a single customer location. As such devices are dedicated (and rather sophisticated in their fail-safes and security), their price tends to be prohibitive for small companies. What is needed is a system which can be connected to existing computer equipment to allow the efficient, economical printing of postage indicia. Such a system would provide postage at a user's location at the user's request.

SUMMARY OF THE INVENTION

According to the present invention, an apparatus and method are described for a modular postage accounting system (MPAS). As will be discussed, many configurations are possible, due to the modularity of the system.

In one embodiment of the present invention, an open system metering device of the present invention consists of a general purpose computer, a digital printer and a secure metering device (SMD). The SMD performs the accounting functions of a postage meter and generates encrypted postage indicia data for transmission by the computer to the digital printer and subsequent printing on a mailpiece. Postage credit data can be entered into the SMD using a CMRS just as it is in a conventional postage meter. This configuration requires the user to maintain a special item of hardware (the SMD) in order to print postage purchased via the CMRS.

In another embodiment, the present invention eliminates that requirement by embedding the SMD functions within the CMRS computer system. A user who has obtained the required license from the postal service can contract with the meter company to interface the user's general purpose computer to the CMRS computer via modem and telephone line. In effect, this provides the postage meter function on a service basis. This has the advantage of simplifying resetting and accounting procedures for the user and eliminates the leasing or housing of any special equipment. Also eliminated is the need to present metering equipment for postal inspection. It also enables one SMD to handle multiple sites in a common account, to accommodate multi-site users that have centralized accounting functions. This last capability has never been possible within the architecture of past or present postage metering systems.

The present invention uses the telephone system to link the user's standard general-purpose computer to a dedicated central-office CMRS computer system. One or more SMD modules may be either attached to or embedded in either the user's computer or the CMRS computer. A single SMD module may an be dedicated to a specific user or it may serve a number of computers. Multiple computers may be placed at one or more sites and multiple sites may be geographically separated. Each SMD module performs all the data storage and accounting functions of a conventional postage meter, and transmits encrypted indicia data for printing. By virtue of the SMD's central location in the system, it automatically consolidates postage accounting data relevant to all the sites it serves. Such data may also be separated so as to report on individual sites. This functionality, too, is unique to the present invention.

The CMRS validates requests from users, and having done so transfers funds from the user's bank account to the postal service's receiving account. The CMRS then either resets the user's postage metering device with the prepaid amount directly, or issues a one-time code to let the user accomplish the reset using the computer's keyboard. In the present invention, this resetting process can be done within a few seconds (in real-time), allowing for near-continuous processing of mail by the user. The CMRS is in constant communication with each SMD, and validation of a reset order can be reduced to a single keystroke, if desired. Once validated by the user, the remainder of the transaction is done by the CMRS/SMD system without further operator intervention.

The present invention allows a multi-site user's individual sites to process mail continuously, with payment to the post office and replenishment of credit handled through central accounting facilities. As long as the user's central accounting facility maintains adequate fund reserves, the individual sites have access to an on-line service which provides postage on an as-needed basis. The need for individual cash accounts to prepay on-site postage meters is thus eliminated, realizing an improvement in corporate cash-flow and better control of the user's funds.

A further understanding of the nature and advantages of the present invention may be realized by reference to the remaining portions of the specification and the drawings.

DESCRIPTION OF THE PREFERRED EMBODIMENT

Figure 1A:
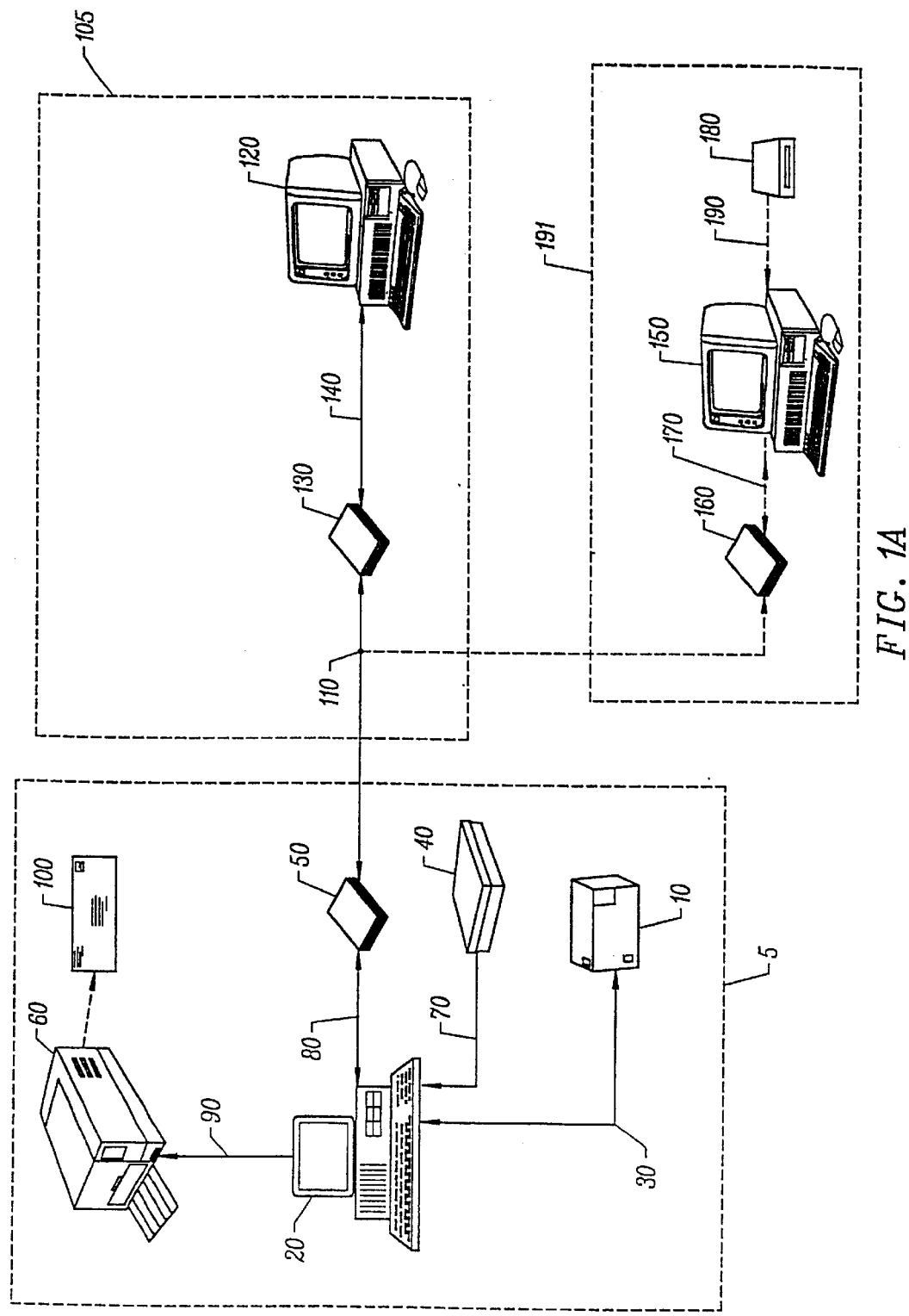
FIG. 1A is a diagram showing a specific embodiment of the present invention.

FIG. 1A is a diagram showing an MPAS 1 designed according to the present invention. MPAS 1 consists of three major components: a CMRS 105, a ZIP-code information system (ZCIS) 191 and an open system metering device (OSMD) 5. The first component, CMRS 105, is a system based on modem communications between a modern electronic postage meter (not shown) and a resetting station computer 120. Well known in the art, the operation of CMRS 105 is the subject of government standards and, while CMRS 105's interaction with OSMD 5 will be discussed later, the operation of CMRS 105 will not be treated in detail here. The second component, ZCIS 191, provides computer access to U.S. ZIP-codes and international postal codes. ZCIS 191 is a commercially-available system, with some 150 installations in the U.S. As such, the operation of ZCIS 191 will not be treated in detail either. However, the interaction between ZCIS 191 and OSMD 5 will also be discussed later. The final component, OSMD 5, performs all of the functions traditionally associated with conventional postage meters and may include a secure metering device (SMD) 10, a general purpose computer (GPC) 20, an electronic scale 40 and a digital printer 60. SMD 10 performs the accounting functions generally associated with the traditional postage meter. SMD 10 generates encrypted postage indicia for transmission by the computer to digital printer 60, where it is subsequently printed on a mailpiece (exemplified by a mailpiece 100).

Figure 1B:
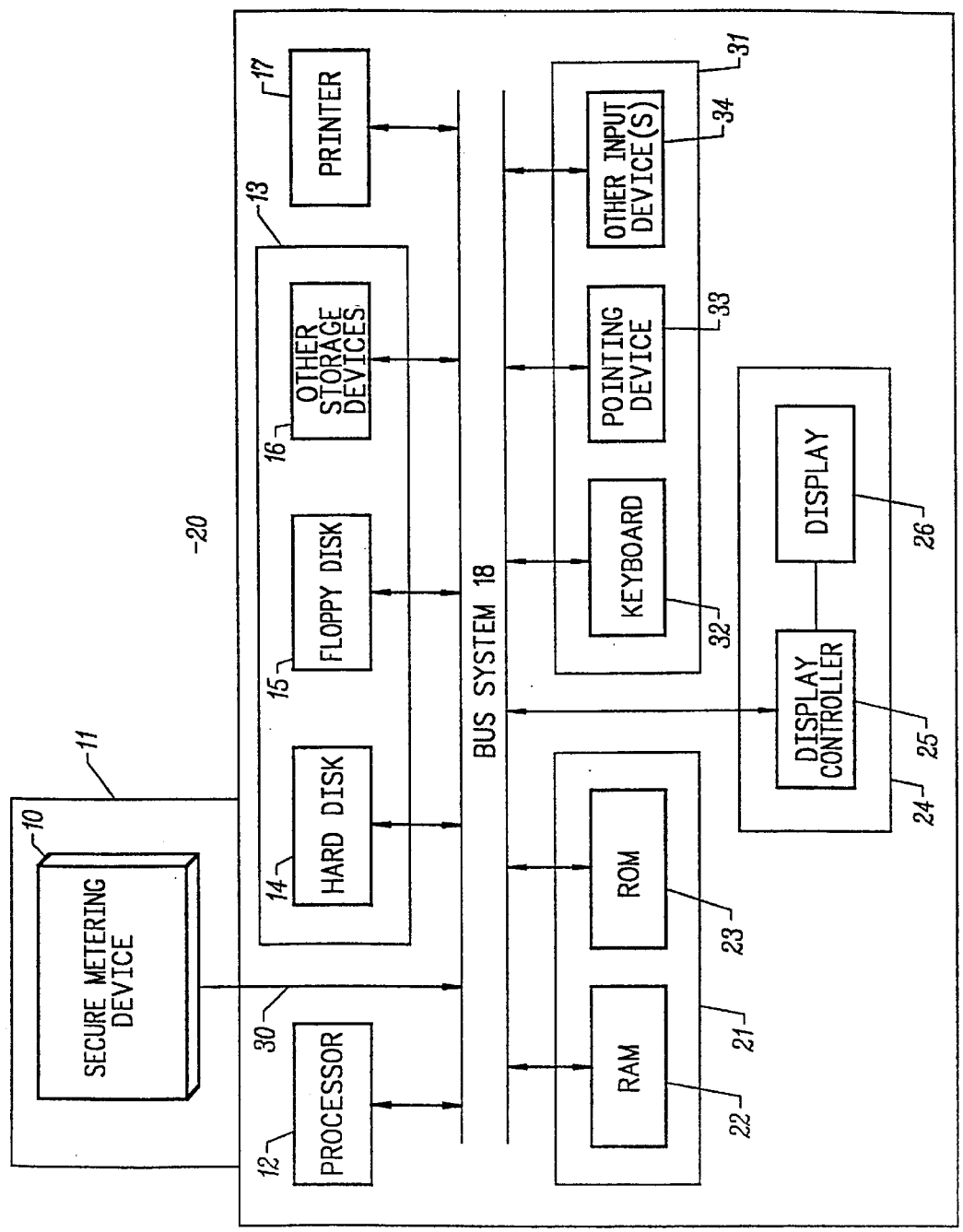
FIG. 1B is a diagram showing an example of a secure communications link between a general purpose computer and a secure metering device.

According to the invention, FIG. 1A shows SMD 10 attached to GPC 20 via a secure communications link 30. Secure communications link 30 may be any mechanism for transferring information that is impervious to unauthorized interception, for example sending encrypted data over an RS-232C serial communications line, transmitting data by wireless techniques (with or without encryption), or by embedding SMD 10 in GPC 20. SMD 10 may be housed separately from GPC 20. As shown in FIG. 1B, a secure housing 11 is provided for SMD 10 to prevent tampering by unauthorized persons. Alternately, SMD 10 may also be housed within GPC 20 and communicate directly with a bus system 18. This communication may be encrypted, if desired. To provide added security on such configuration, encryption may be used on the software residing in GPC 20.

FIG. 1B is a simplified block diagram of GPC 20 in which the present invention may be embodied. In accordance with known practice, GPC 20 includes a processor 12 that communicates with a number of peripheral devices via bus subsystem 18. These peripheral-devices typically include a memory subsystem 21, a user input facility 31, a display subsystem 24, output devices such as a printer 17, and a file storage system 13. Memory subsystem 21 may consist of a number of memory units, including a main random access memory (RAM) 22 and a read only memory (ROM) 23 in which fixed instructions may be stored. User input facility 31 typically includes a keyboard 32 and may further include a pointing device 33 (e.g., a mouse, trackball or the like) or other common input devices. Display subsystem 24 typically includes a display device 26 (e.g., a cathode ray tube (CRT) or similar device) coupled to display controller 25. File storage system 13 may include a hard disk 14, a floppy disk 15 or other storage media 16.

In this context, the term "bus subsystem" is used generically so as to include any mechanism for letting the various components of the system communicate with each other as intended. With the exception of the input devices and the display, the other components need not be at the same physical location. Thus, for example, portions of the file storage system could be connected via various local-area or wide-area network media, including telephone lines. Similarly, the input devices and display need not be at the same location as the processor, although it is anticipated that the present invention will most often be implemented in the context of general purpose computers and workstations.

Bus subsystem 18 is shown schematically as a single bus, but a typical system has a number of buses such as a local bus and one or more expansion buses (e.g., ADB, SCSI, ISA, EISA, MCA, NuBus, or PCI), as well as serial and parallel ports. Network connections are usually established through a device such as a network adapter on one of these expansion buses or a modem on a serial port. The computer system may be a desktop system or a portable system, or may be a larger "mainframe" system.

As FIG. 1A indicates, a communications line 90 (e.g., a parallel printer line) connects GPC 20 to digital printer 60 (preferably a laser-printer). This facilitates the printing of postage indicia on labels and envelopes (exemplified here by mailpiece 100). Optionally, electronic scale 40 may be attached to GPC 20 (via a communications line 70). A communications line 80 (e.g., an RS-232C serial communications line) also connects GPC 20 to a communications interface device 50 (e.g., a modem). Communications interface device 50 provides access to computerized meter resetting system (CMRS) 105 via a communications medium 110. Resetting station computer 120 communicates postage information (for example, resetting information or auditing information) with GPC 20 and SMD 10 via a communications interface device 130 connected to communications medium 110 and to resetting station computer 120 via a communications line 140. Optionally, GPC 20 and SMD 10 may communicate with ZCIS computer 150. ZCIS computer 150 is connected to communications medium 110 via a communications line 170 and a communications interface device 160. Also connected to ZCIS computer 150 via a communications line 190 is a CD-ROM device 180, which holds U.S. ZIP-code and international postal code information.

As is well known in the art, a system such as this requires operating software (not shown). Software resident on GPC 20 enables GPC 20 to communicate with CMRS 105, SMD 10, digital printer 60 and, optionally, electronic scale 40. Software with these capabilities is commercially available, and so will not be described in detail herein. The protocol used by CMRS 105 (which supports communication between SMD 10, GPC 20 and CMRS 105) is also well-known, as it is the subject of a U.S. government standard. Software resident on SMD 10 is also well-known and is similar to that disclosed in U.S. Pat. No. 4,484,307, by Quatse et al., the disclosure of which is incorporated herein by reference.

Communication between GPC 20 and SMD 10 is bi-directional. GPC 20 sends control commands and information requests to SMD 10. SMD 10, in return, may send human-readable data (in response to information requests), postage indicia (in response to postage requests and which are encrypted) or both. For example, postage is requested by a user (not shown) by the user's entering postage information into GPC 20. GPC 20 sends this information, together with mail class/service, any other values required (e.g., insurance) and the destination ZIP-code to SMD 20. Any failure in this communication prevents further issuance of postage by SMD 10. In turn, SMD 10 responds by generating a secure (via encryption) postage indicia file together with a license number and transmitting that information to GPC 20. GPC 20 then takes this information and constructs a postage indicia print file including a two-dimensional code, graphical information and human-readable data. The postage indicia print file, together with optional information (such as address information, ZIP-code barcoding and any user-defined information) is transmitted to printer 60 for printing.

Figure 2A:
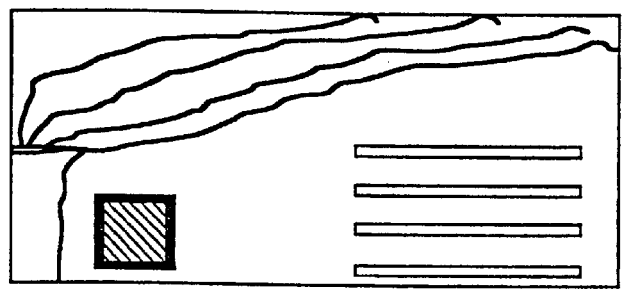
FIG. 2A is a diagram showing an example of a postage indicium produced by the present invention with postage information symbology located inside the postage indicium.
Figure 2B:
FIG. 2B is a diagram showing an example of a postage indicium produced by the present invention with postage information symbology located outside the postage indicium.
Figure 2B:
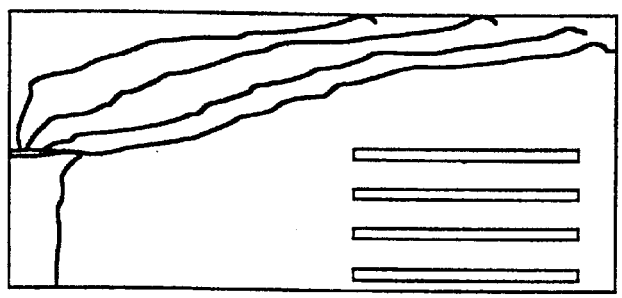
Figure 2C:
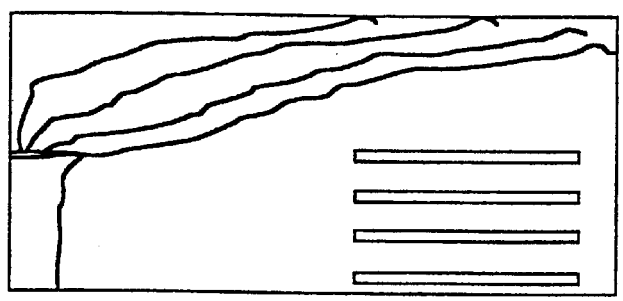
FIG. 2C is a diagram showing an example of a postage indicium produced by the present invention without postage information symbology.
Figure 3:
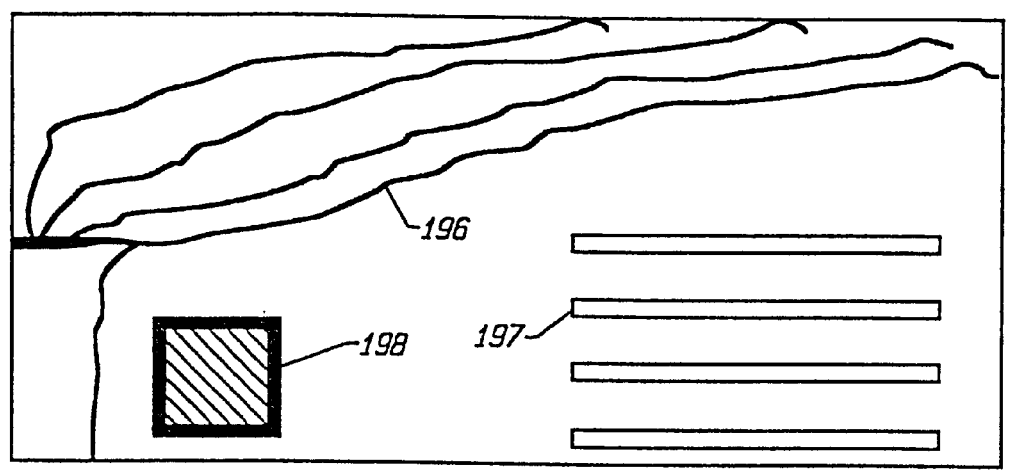
FIG. 3 is a diagram showing an enlarged example of a postage indicium produced by the present invention with postage information symbology located inside the postage indicium.

Printer 60 then imprints the postage indicium and other information onto an envelope (mailpiece 100), a label (not shown) or other means of affixation of postage. Examples of postage indicia are shown in FIGS. 2A–2C. As shown in FIG. 3 (an enlargement of FIG. 2A), a postage indicium 195 may include such features as a graphic 196, human-readable postage information 197 and encoded postage information 198. As shown in FIGS. 2A–2C, encoded postage information 198 may be included inside or outside postage indicium 195, or omitted entirely. Tables 1 and 2 include listings of other communications that can occur between GPC 20 and SMD 10.

TABLE 1

Communications Between GPC and SMD

| ITEM | DESCRIPTION | FUNCTION | APPROACH |
|---|---|---|---|
| 1 | SERVICES: | | |
| 1.1 | Install | To reset the lock on the SMD which is set by the factory before shipping. | User follows instructions to connect the SMD via the PC system to the Neopost remote centre. Once the status is checked a code is transmitted to unlock the SMD for use. Successful unlock is confirmed. A way to ensure the correct install location may also be required. |
| 1.2 | Reset Postage | To charge the SMD with a new postage payment. | Direct connect version of POC. Read and check registers and make and confirm transaction. Any amount limitations eg min/max/increments will be controlled by the POC centre. |
| 1.3 | Set Reset Code Lock | To block the SMD in the event of an attempted misuse. | After receipt of a sequence of 16 wrong postage payment reset codes the SMD will lock-out. A message is sent to the user with instructions. |
| 1.4 | Unlock Code | To reset the SMD lock-out condition. | The user must contact the Neopost POC enquiry line. If a reset is to be initiated the register status is validated and a reset code is issued and the unlock action confirmed. |
| 1.5 | Remote Diagnostics Status | To read the contents of the fault register. | In the event of a detectable fault which could put accountability at risk the SMD is blocked and the fault is recorded. On-line the Neopost support service will be able to read the fault register. |
| 1.6 | Reset Soft Fault | To reset a soft fault which unblocks the SMD. | In the event that accountability is not compromised and following verification of data a code can be issued to reset the fault flag. The resetting of the flag is confirmed. If the fault proves to be permanent the SMD must be returned for service or replacement. |
| 1.7 | Reconfigure | To reconfigure certain parameters in the SMD which have been designed into the system. | A read confirmation is made followed by a code which changes the status of variant registers. The reconfiguration action must be verified before the SMD is released again for use. It should be possible to configure: a) decimal or fraction b) change inspection period in months from 3 to 12, for example, and c) correct any permissible data errors. |

TABLE 1-continued

Communications Between GPC and SMD

| ITEM | DESCRIPTION | FUNCTION | APPROACH |
|---|---|---|---|
| 1.8 | Withdraw | To set the displayed descending register to zero and block the SMD from use. | A read confirmation is made followed by a code which locks the SMD from use. In this condition the SMD when read will show the descending register as zero but the original contents of the descending register is retained for later verification, if required, by a service centre. |
| 2 | OPERATIONS: | | |
| 2.1 | User Access PIN | To provide a user PIN to safeguard use of the postage function. | The PIN will be 4 digits and based on an algorithm derived from the serial #. For the SMD the PIN is fixed and is required each time the SMD is switched on. The PC gives the user the option to enter a PIN or not as well as the possibility to change the PIN. This flexibility is managed in the PC. Service access to the SMD information is always possible via the SMD service mode and unique access code. |
| 2.2 | Zero test imprint | To enable the user or service to test the system with a zero value postage imprint; all normal meter functions are active. | This can be a menu selection via the PC. Zero test prints will not register on the USPS cycle counter. It is acceptable for the PC to add the word "TEST" diagonally across the print or in anther suitable format. |
| 2.3 | Request Postage | To enable normal postage values to be selected. | This request can be initiated by a user making a direct postage value entry or from a postage value calculation with a scale or from a look-up table (menu). The PC sends the postage value to the SMD together with the Mail class/service (complete with any values reqd. eg insurance) and the Destination ZIP+4+2. It should be possible for the user to set up a print run for a batch of envelopes comprising the same postage value eg for a mailing. The user should be advised if there is insufficient credit to complete the run. |
| 2.4 | Issue Postage | To provide the PC with the indicia postage file. | The SMD generates a secure indicia postage file and sends this to the PC together with the license. This communication must be secure and closed loop. Any failure in this communication cycle prevents further issue of postage together with a fault message to the user. The PC constructs the indicia print file comprising a 2D code, graphics and human readable data. The indicia print file together with a CASS address and ZIP+4+2 barcode and any user defined information is issued to the printer. Once the data is issued to the printer it is fixed; it cannot be changed by normal PC application software. |
| 2.5 | Re-print Postage | To allow up to 3 total attempts to print an indicia (fixed state). | In the event of a printer malfunction and the printer is lost the user can try up to two more times. This function is managed by the PC since the SMD issues only one indicia for one recorded postage. The PC adds a "*" to the imprint and communicates the number of re-prints to the SMD. |
| 2.6 | Date Advance | To advance the date for processing items for future posting. | The user can select a forward date only for printing post. The postage date is managed by the SMD. The user can request a forward posting date up to 3 days in advance. |
| 2.7 | Fault Message | To advise the user of a fault and to give appropriate instructions. | In the event that a fault is detected by the SMD a fault code is generated and, if possible, communicated to the PC. Regardless, the PC displays a fault message. The fault code is recorded in the SMD service history register. It is acceptable for the SMD to retain only the last 10 faults. |

TABLE 1-continued

Communications Between GPC and SMD

| ITEM | DESCRIPTION | FUNCTION | APPROACH |
|---|---|---|---|
| 3 | INSPECTION: | | |
| 3.1 | Advanced Inspection Flag Warning | To advise the user of an upcoming inspection. | Whenever the system is switched on within one week of an inspection date the user will be advised that a remote inspection is required by the required date; a message tells the user how to initiate an inspection. The date is controlled by the set inspection date in the PC. An inspection can be made at any time during this warning period. |
| 3.2 | Inspection Reset | To advise the user an inspection must be made by the expiry date. | To display a permanent message on the date of expiry that an inspection must be made this date otherwise the system will be locked until the inspection is completed. |
| 3.3 | Inspection | To make an inspection of the SMD. | A remote communication is initiated by the PC with the Inspection Centre. Provision shall be made for the Inspection Centre to be a different telephone number to the POC Direct Resetting Centre. All registers are transmitted as with a POC Direct Connect resetting plus usage statistics and number of reprints register. It is assumed that the inspection will have to be made separately to a normal remote postage payment resetting. However, if transmission time permits, all the information communicated during an inspection should also be included in each read sequence of the normal postage resetting transaction. |
| 3.4 | No Inspection After Time Out (SMD Blocked) | To block the SMD in the event that an inspection is not made by the required date. | At midnight of the last date by which inspection is required, the SMD is blocked and a user message is displayed on the PC. The message informs the user that an inspection must be made before further postage can be dispensed. |
| 3.5 | Inspection Failure | To advise the user in the event of a failure to complete the inspection satisfactory. | If an inspection fails to be completed satisfactory for any reason the system should try to reinitiate another inspection cycle. Up to 3 maximum attempts should be made before an error message is displayed. An error code is also recorded. A wait message should be displayed to the user while the remote transmission is in operation. When the inspection is complete a user message will be displayed together with the next date an inspection is required. |
| 4 | REPORTS: | | |
| 4.1 | Status Reports | To print a report of all user non secure registers. | All user register information is communicated, upon request, to the PC. The PC defines the report format. The report shall have a title, date, license #, register values and system set-up e.g. postage range, last inspection date, low credit warning level, high value interlock level, etc. |
| 4.2 | Postage Reset Statement | To print a statement of new postage payment. | Upon request, the SMD communicates relevant information as listed in the example given in DTG/F1724 dated Oct. 25, 1995. The PC defines the report format. Additional information listed in F1724 is provided from the PC. It should be only possible to print the statement immediately after a postage payment transaction, i.e. prior to printing postage. |
| 4.3 | Usage Statistics | To print user reports on system usage. | Reports can be provided by the PC on usage, viz for any given period by selected services or service, the $ value and # of items sent. The user should be able to print the report in tabular and graphical representations. Note: the SMD will also record basic usage statistics information which can be transmitted during an on-line postage resetting or inspection. |

TABLE 1-continued

Communications Between GPC and SMD

| ITEM | DESCRIPTION | FUNCTION | APPROACH |
|---|---|---|---|
| 4.4 | Audit Report Checksum | To print a system usage audit report with some level of validation. | It is proposed that at the time this report is made the current values of the ascending and descending registers are used to generate a validation code. This code is generated by the SMD, on request, and printed at the end of the report. The code can be based on a function of the above SMD registers and the license number. |
| 4.5 | Service History Report | To print in service mode the contents of the service history fault register. | A means shall be devised to put the SMD into a service mode. This could be achieved, for example, with a dedicated PC software and a service PIN. In this mode the contents of the service history fault register can be printed out. The last recorded faults are retained even if faults were reset; resets are also recorded. Fault codes should be printed with a description of each fault code listed. |
| 5 | FACTORY/REPAIR: | | |
| 5.1 | Functional Test | To make a system functional test via the SMD communication with the PC. | The SMD should contain sufficient test software to enable a functional test to be made to verify all basic functions, both internal and coms, with the PC. Note: a secure internal connection means is provided to allow the SMD to be initialized during manufacture with direct memory read/write access and testing. This connection means is not accessible once the housing is applied without mutilation of the housing. |

TABLE 2

GPC/SMD Communications
(Including Non-Factory/Repair Functions)

| ITEM | DESCRIPTION | COMMENTS | COMMUNICATION INITIATED BY | SECURE (YES/NO) |
|---|---|---|---|---|
| 1 | SERVICES | | | |
| 1.1 | INSTALL | UNLOCK FROM FACTORY | GPC[1] | YES |
| 1.2 | RESET POSTAGE | RESET TRANSACTION | GPC[1] | YES |
| 1.3 | SET RESET CODE LOCK | LOCK AFTER 16 WRONG CODES & SEND MESSAGE | SMD | NO |
| 1.4 | UNLOCK CODE | RESET LOCK | GPC[1] | YES |
| 1.5 | REMOTE DIAGNOSTICS STATUS | READ STATUS OF FAULT REGISTERED | GPC[1] | NO |
| 1.6 | RESET SOFT FAULT | RESET FAULT FLAG | GPC[1] | YES |
| 1.7 | RECONFIGURE | VARIANT CODE (E.G., FRACTIONAL AND INSPECTION PERIOD) | GPC[1] | YES |
| 1.8 | WITHDRAW | SET DESCENDING REGISTER FLAG TO ZERO | GPC[1] | YES |
| 2 | OPERATIONS | | | |
| 2.1 | USER ACCESS PIN | | GPC | NO |
| 2.2 | ZERO TEST IMPRINT | | GPC | YES |
| 2.3 | REQUEST POSTAGE | VALUE, CLASS, SERVICE, AND ZIP TO SMD | GPC | NO |
| 2.4 | ISSUE POSTAGE | INDICIA FILE TO GPC (ONLY ONCE) | SMD | YES |
| 2.5 | DATE ADVANCE | FUTURE POST DATE WITH LIMITATIONS | GPC | NO |
| 2.6 | FAULT MESSAGE | USER INFORMATION | SMD | NO |
| 3 | INSPECTION | | | |
| 3.1 | ADVANCED INSPECTION FLAG WARNING | USER MESSAGE FROM TIME SET FLAG | SMD | NO |

TABLE 2-continued

GPC/SMD Communications
(Including Non-Factory/Repair Functions)

| ITEM | DESCRIPTION | COMMENTS | COMMUNICATION INITIATED BY | SECURE (YES/NO) |
|---|---|---|---|---|
| 3.2 | INSPECTION RESET | USER MESSAGE TO RESET FLAG | SMD | NO |
| 3.3 | INSPECTION | RESET FLAG IN SMD | GPC[1] | YES |
| 3.4 | NO INSPECTION AFTER TIME OUT (SMD BLOCKED) | USER MESSAGE - SMD BLOCKED UNTIL INSPECTION COMPLETE | SMD | NO |
| 3.5 | INSPECTION FAILURE | USER MESSAGE INSPECTION COMPLETE (YES OR NO) | SMD | NO |
| 4 | REPORTS | | | |
| 4.1 | STATUS REPORTS | SMD (NON-SECURE READ) REGISTER VALUES/SET-UP | GPC | NO |
| 4.2 | POSTAGE RESET STATEMENT | BEFORE/AFTER/TOTALS INFORMATION | GPC | NO |
| 4.3 | USAGE STATISTICS | SERVICES/MONEY VALUE/ NUMBER | GPC | NO |
| 4.4 | AUDIT REPORT CHECKSUM | PERIOD REPORT CHECKSUM VALIDATION | GPC | YES |
| 4.5 | SERVICE HISTORY REPORT | REMOTE-RESETTABLE OR SELF-RESETTING FAULTS | GPC[2] | YES |
| 5 | NON-FACTORY/REPAIR FUNCTIONS VIA SERVICE PORT | | | |
| 5.1 | INITIALIZE | | | |
| 5.2 | MEMORY READ/WRITE ACCESS | | | |
| 5.3 | TEST | | | |
| 6 | NON-FACTORY/REPAIR FUNCTIONS VIA GPC PORT | | | |
| 6.1 | FINAL FACTORY TEST (GPC INITIATED) | | | | where notations marked "[1]" are remote functions (performed, for example, via modem or automatic voice response code) and notations marked "[2]" are accessed at factory/repair-facility locations via a service pin (or the like).

where notations marked "[1]" are remote functions (performed, for example, via modem or automatic voice response code) and notations marked "[2]" are accessed at factory/repair-facility locations via a service pin (or the like).

GPC 20, connected to communications medium 110 via communications interface device 50, accesses CMRS 105 for resetting SMD 10, auditing by postal authorities, and other purposes. This allows the entry of postage credit in a manner similar to conventional electronic postage meters. In the present invention, GPC 20 communicates with resetting station computer 120 to reset SMD 10 (i.e., add postage credit to the values currently contained in SMD 10). Other functions may, of course, be provided in a similar manner.

Figure 4:
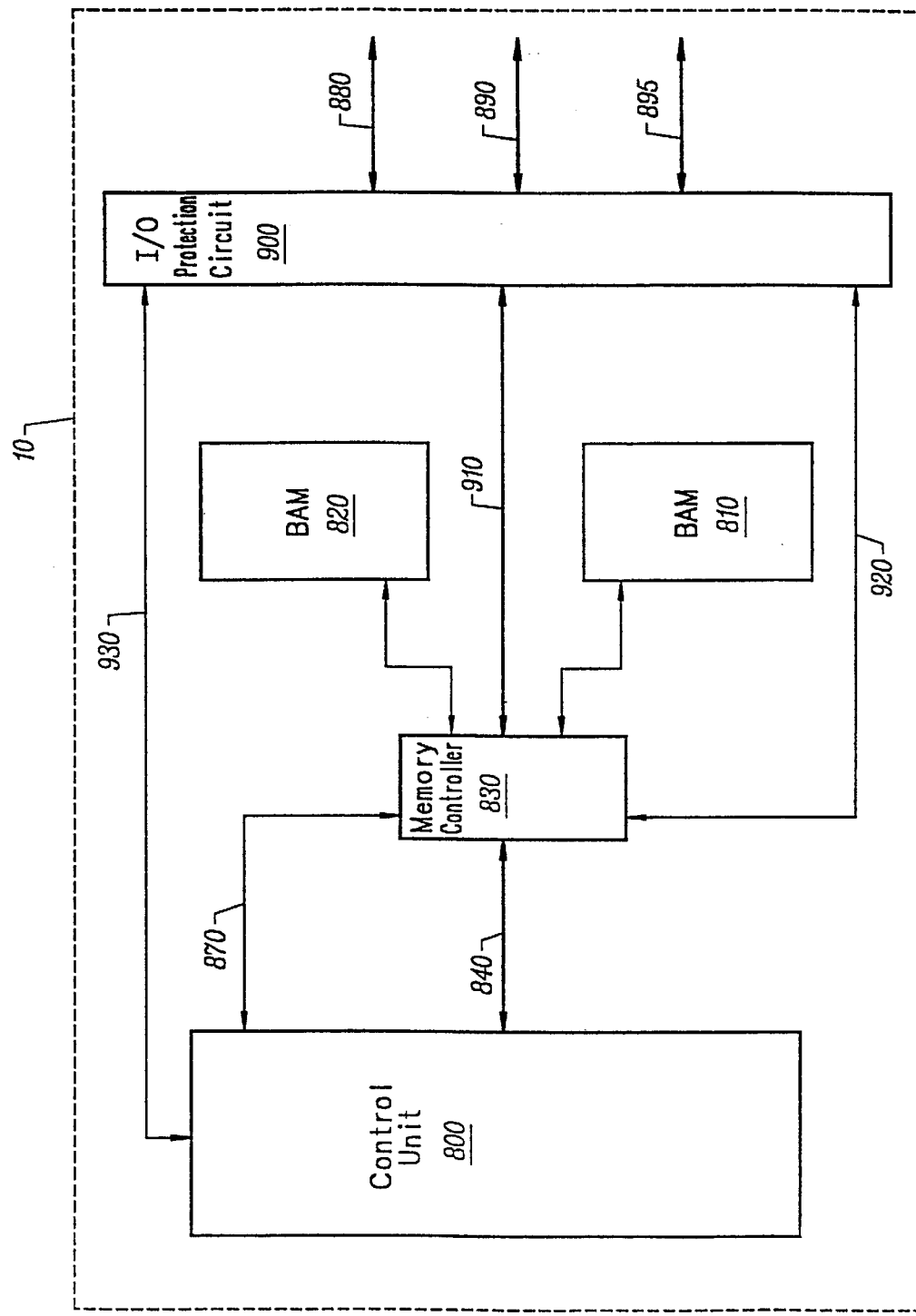
FIG. 4 is a diagram showing an example of a secure metering device (SMD)
Figure 5:
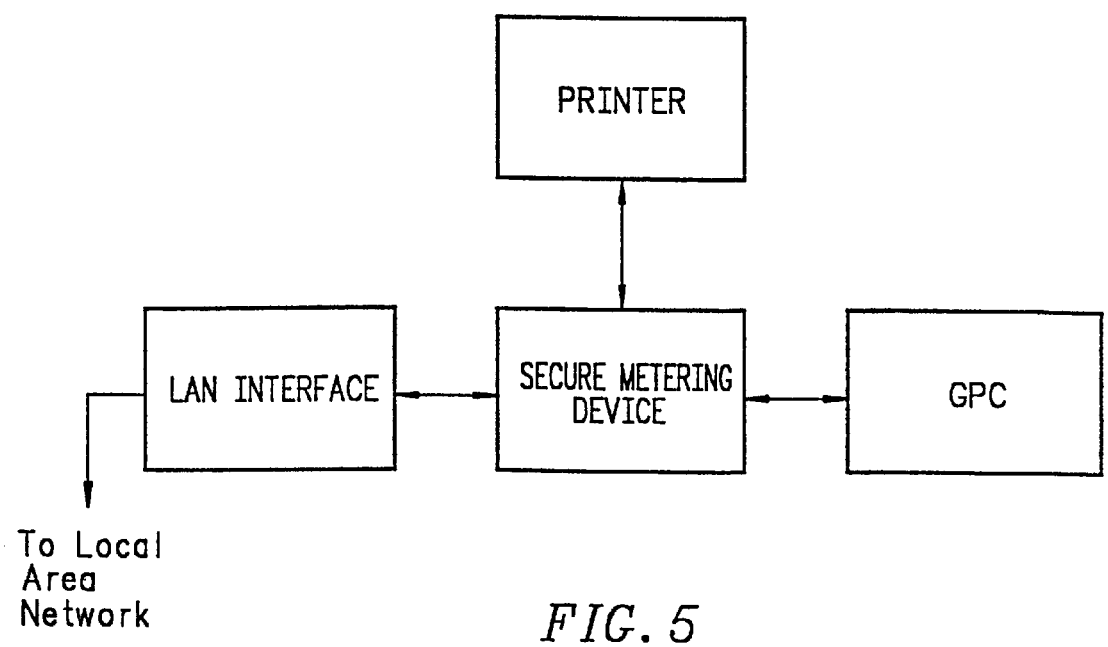
FIG. 5 is a diagram showing an example of an SMD having a network interface and printing capabilities.

FIG. 4 is a diagram showing SMD 10 designed according to the present invention. A battery augmented memory (BAM) 810 (and, optionally, a second BAM 820) receive data from and provide data to a memory controller 830. BAM's 810 and 820 may consist, for example, of static RAM memory and batteries for providing non-volatile storage of postage accounting information. This postage accounting information, as is well known in the art, generally includes an ascending register, a descending register and a control total register (none of which are shown in FIG. 4). As is also well-known in the art, an ascending register holds a value equal to the amount of postage used, a descending register holds a value equal to the amount of postage which remains unused and a control total register holds the sum of the ascending and descending registers. Memory controller 830 may be accessed by a control unit 800 or an I/O protection circuit 900. Control unit 800 accesses BAM's 810 and 820 by reading or writing on data lines 840, and controls these operations via control lines 870. I/O protection circuit 900 accesses BAM's 810 and 820 by reading or writing data on data lines 910, and controls these operations via control lines 920. I/O protection circuit 900 also contains a service port 880 and an I/O port 890. Service port 880 allows direct access (with proper access codes) to BAMs 810 and 820, for the repair and maintenance of SMD 10. I/O port 890 supports communications with a general purpose computer (not shown). A printer port 895 is optional and may be connected to a printer (not shown) to allow the printing of postage indicia directly from SMD 10. Such a configuration is shown in FIG. 5. Also shown in FIG. 5 is an SMD containing a network interface, allowing the transmission of encrypted postage indicia files to remote computers over a network. This configuration is discussed later in this section.

Control unit 800 communicates with service port 880, I/O port 890 and printer port 895 via control/data lines 930 and I/O protection circuit 900. Control unit 800 contains circuitry for controlling the functions of SMD 10, and may also contain a real-time clock (not shown) and memory (also not shown). Encryption may be performed by a sub-unit of control unit 800 (not shown; e.g., a hardware encryptor) or by software algorithm (e.g., the well-known RSA algorithm). SMD 10 may contain postage accounting information for a single department (e.g., the entire company is represented by a single account) or may contain postage accounting information for two or more departments within a customer's organization. Moreover, such departments may be widely dispersed geographically given the capabilities of the present invention. As use of the present invention consolidates postage accounting information, multi-site users will benefit from simplified, more efficient tracking of such information. The present invention will also make site-specific postage accounting information available to the user's central accounting facility and to the site accounting facility as well. The reader will note that the internal architecture of SMD 10 in the present invention parallels that of the invention disclosed in U.S. Pat. No. 4,484,307, by Quatse et al., the disclosure of which has already been incorporated herein by reference. Thus, the internal architecture of SMD 10 is well known and will not be described in further detail.

Beyond those already mentioned, many other advantages are provided by the present invention. The software and hardware required to implement the present invention are inexpensive in comparison to conventional postage metering systems, allowing postage metering dedicated to a particular user. Postage may be provided as an on-line service to individual sites of a multi-site user. In comparison to conventional postage meters, use of postage itself is simplified. The individual user or site need not maintain logbooks, lease equipment, comply with any special regulations, physically transport a postage metering device to a post office for inspection nor perform the other custodial tasks related to the use of conventional postage meters.

Figure 6:
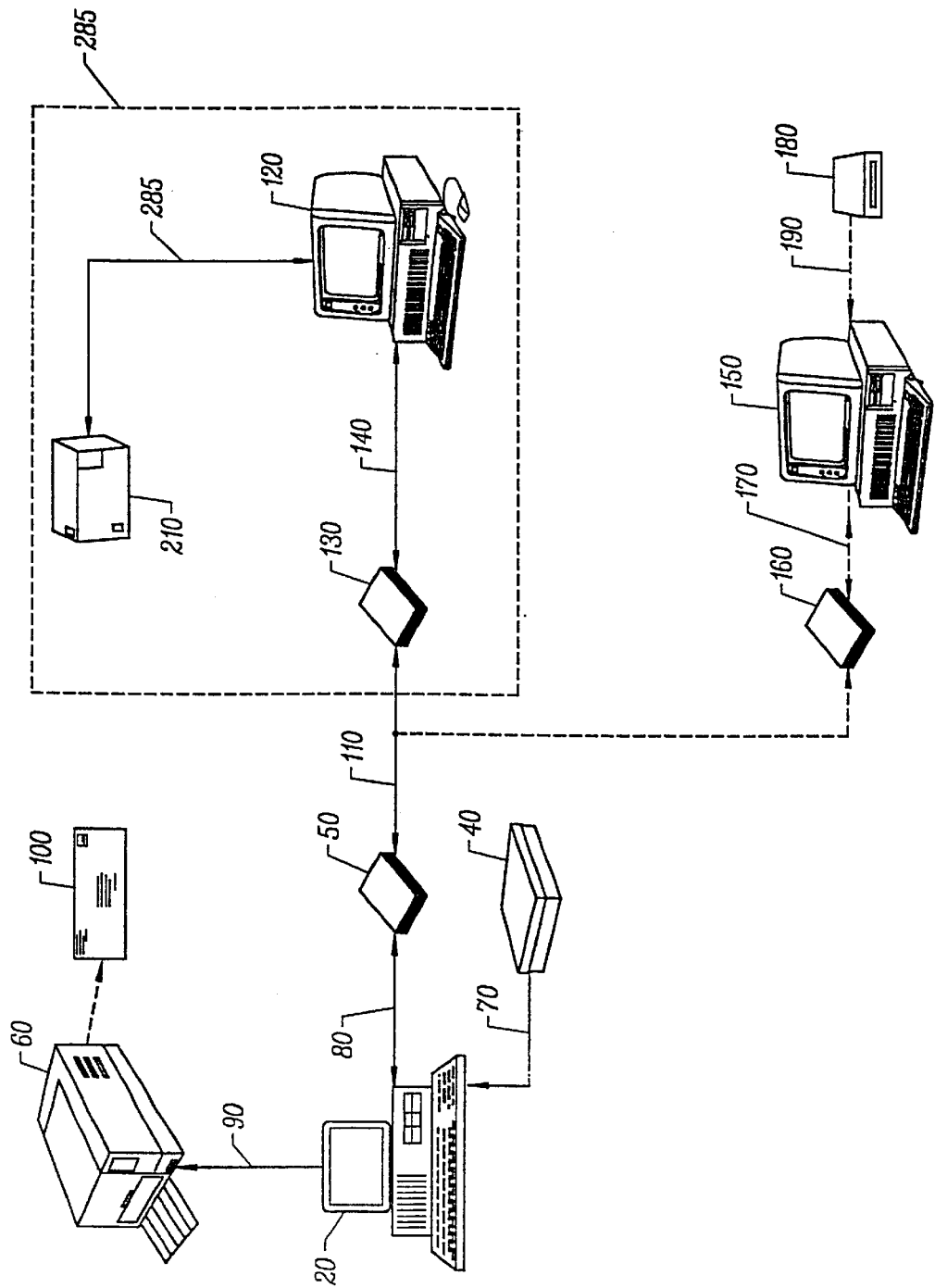
FIG. 6 is a diagram showing second specific embodiment of the present invention, wherein the SMD is connected to a resetting station computer.

A second embodiment of the present invention, shown in FIG. 6, operates in a manner similar to that of the above embodiment. Elements depicted in previous figures are referred to in FIG. 6 using the reference numerals assigned in the figure in which the given element originally appears. However, in this case, an SMD 210 is connected to resetting station computer 120 via secure communications link 230. In this configuration, a user needing postage, for example, enters their request using a GPC 20. GPC 20 communicates this request (containing information similar to that in the preceding example) to resetting station computer 120. This communication is accomplished via communications interface device 50, which provides access to communications medium 110 and thereby to communications interface device 130 connected to resetting station computer 120. Resetting station computer 120 relays the request to SMD 210. Multiple SMDs may be connected to resetting station computer 120 and may be organized in any fashion. For example, a customer may have all their postage information retained in a single SMD or multiple SMDs. Further, an SMD may contain postage accounting information for a single department (e.g., the entire company is represented by a single account) or for multiple departments.

SMD 210 responds to the request in the manner previously described, in this case by returning a secure (encrypted) postage indicia file and a license number. This information returns to GPC 20 via the communications path outlined above. GPC 20 takes the information provided by SMD 210 and constructs a postage indicia print file, as before. The postage indicia print file, together with the optional information (such as address information, ZIP-code barcoding and any user-defined information) is communicated to a printer 60 for printing. As noted above, tables 1 and 2 include listings of other communications which can occur between GPC 20 (and so resetting station computer 120) and SMD 210.

Figure 7:
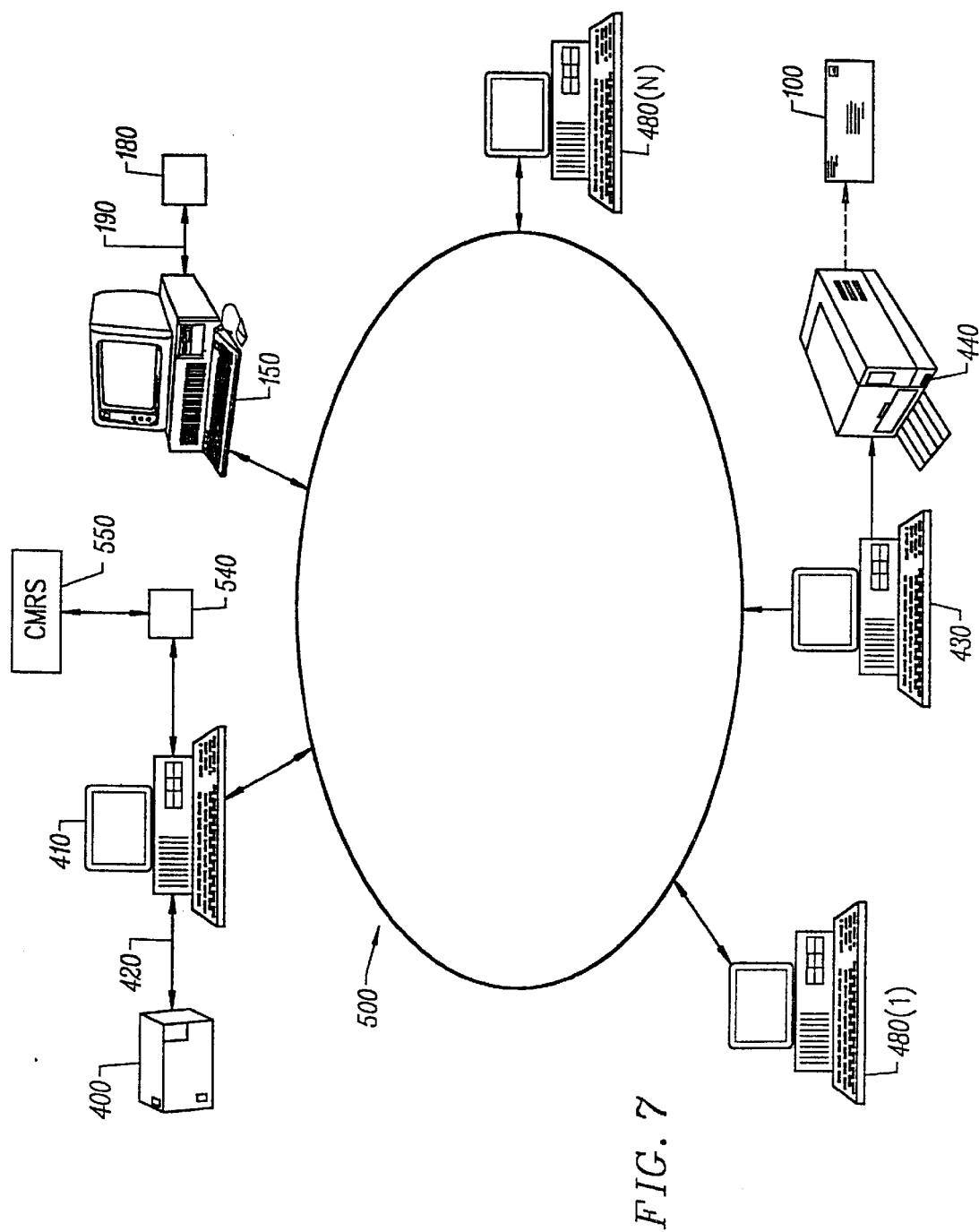
FIG. 7 is a diagram showing a third specific embodiment of the present invention using a local area network for the communications medium.

A third embodiment of the present invention, shown in FIG. 7, operates in a manner similar to that of the preceding embodiments. Elements depicted in previous figures are referred to in FIG. 7 using the reference numerals assigned in the figure in which the given element originally appears. However, in this case, a GPC 410 is connected to a local-area network (LAN) 500. Although LAN 500 is shown in a star topology, other computer network topologists and networking techniques may be used. GPC 410 is again connected to an SMD 400 via a secure communications link 420. In this configuration, a user needing postage, for example, enters their request using a GPC 430. GPC 430 may be one of several GPCs attached to LAN 500 (exemplified in FIG. 7 by GPCs 480(1)–(N)). GPC 430 communicates this request (containing information similar to that in the preceding examples) to GPC 410 via LAN 500. GPC 410 relays the request to SMD 400, which responds in the manner outlined in the preceding examples (i.e., SMD 400 generates encrypted postage indicia for transmission by the computer to a digital printer 440, where it is subsequently printed on a mailpiece (exemplified by mailpiece 100)). Again, a CMRS 550 may be communicated with using a communications interface device 540, as can a remote ZCIS (not shown). However, a ZCIS computer 150 may reside on LAN 500 to provide ZIP-code information (in the manner previously described) to any computer connected to LAN 500.

Figure 8:
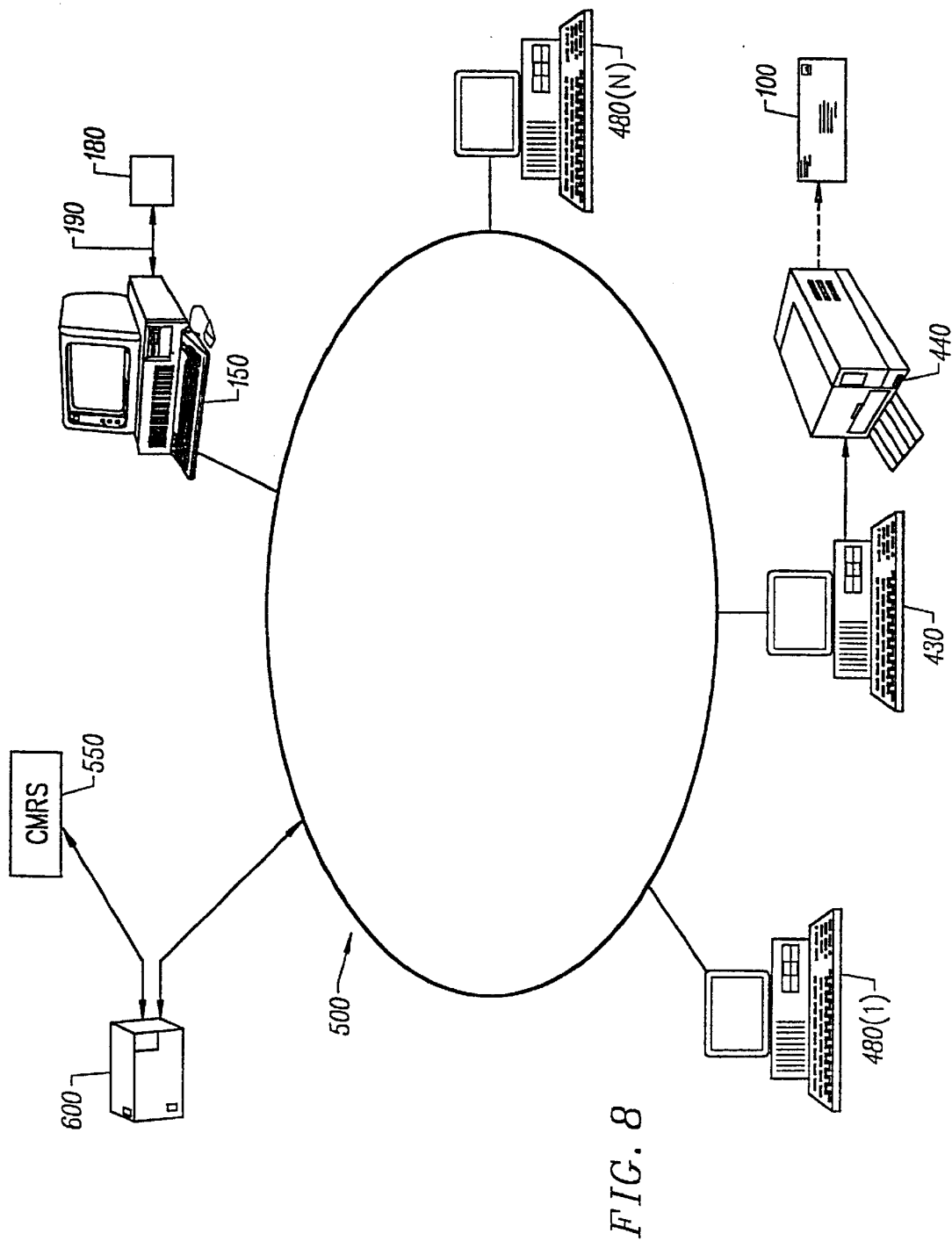
FIG. 8 is a diagram showing a fourth specific embodiment of the present invention using a local area network for the communications medium.

In the example, GPC 410 then returns the encrypted postage indicia file generated by SMD 400 to GPC 430, which in turn constructs a postage indicia print file, as before. The postage indicia print file, together with optional information (such as address information, Zip code barcoding and any user-defined information) is transmitted to printer 440 for printing. Tables 1 and 2 include listings of other communications which can occur. As in the preceding example, more than one SMD may be connected to GPC 410. Moreover, there may be multiple GPCs on the LAN providing postage. Numerous topologists and configurations are thus possible and are to be considered as part of this application. Additionally, SMD 400 may reside remotely at a resetting station computer (not shown) as part of a CMRS 550, as in the second example. Communications form GPC 430 would be transmitted over LAN 500 to GPC 410. GPC 410 sends the information to CMRS 550 via communications link 540. CMRS 550 responds and the information is passed back along the same path to GPC 430. Further, as shown in FIG. 8, an SMD 600 may provide these services directly to GPC 430 via LAN 500, without the need for GPC 410. Elements depicted in previous figures are referred to in FIG. 8 using the reference numerals assigned in the figure in which the given element originally appears.

A secure means of authenticating postage indicia is of great importance to the United States Post Office, which loses millions (and potentially billions) of dollars a year to the use of fraudulent postage indicia. In all the preceding embodiments, a printer imprints postage indicium and other information on mailpiece 100. As shown in FIG. 3, postage indicium 195 may include human-readable postage information 197 and encoded postage information 198. These can be used to determine the authenticity of the affixed mark. Encoded postage information 198 is generated in the following manner. Information from SMD 10 (and, optionally, from GPC 20) may be encrypted by SMD 10 using an encryption algorithm (e.g., DES, RSA or a comparable algorithm). The information is then converted into a printable binary code of some sort. Examples of a printable binary code include bar codes, data matrix, PDF417 or other comparable method. An example of a data matrix is the data matrix described in the AIM USA Technical Specification entitled "Uniform Symbology Specification" (AIM USA Technology Group, Pittsburgh, Penn.; Draft of May 18, 1995), which is hereby incorporated by reference in its entirety. The PDF417 printable binary code is described in "RPS Multicode Bar-Code Label Guide" (RPS Roadway Package System, Draft of May, 1995 (Rev. 2)), which is hereby incorporated by reference in its entirety. The data matrix method is of particular interest because it allows the printing of a relatively large amount of data in a small space. As the present application (postage on envelopes, labels and the like) requires minimal consumption of available area, efficient use of printing area in an advantage.

Figure 9:
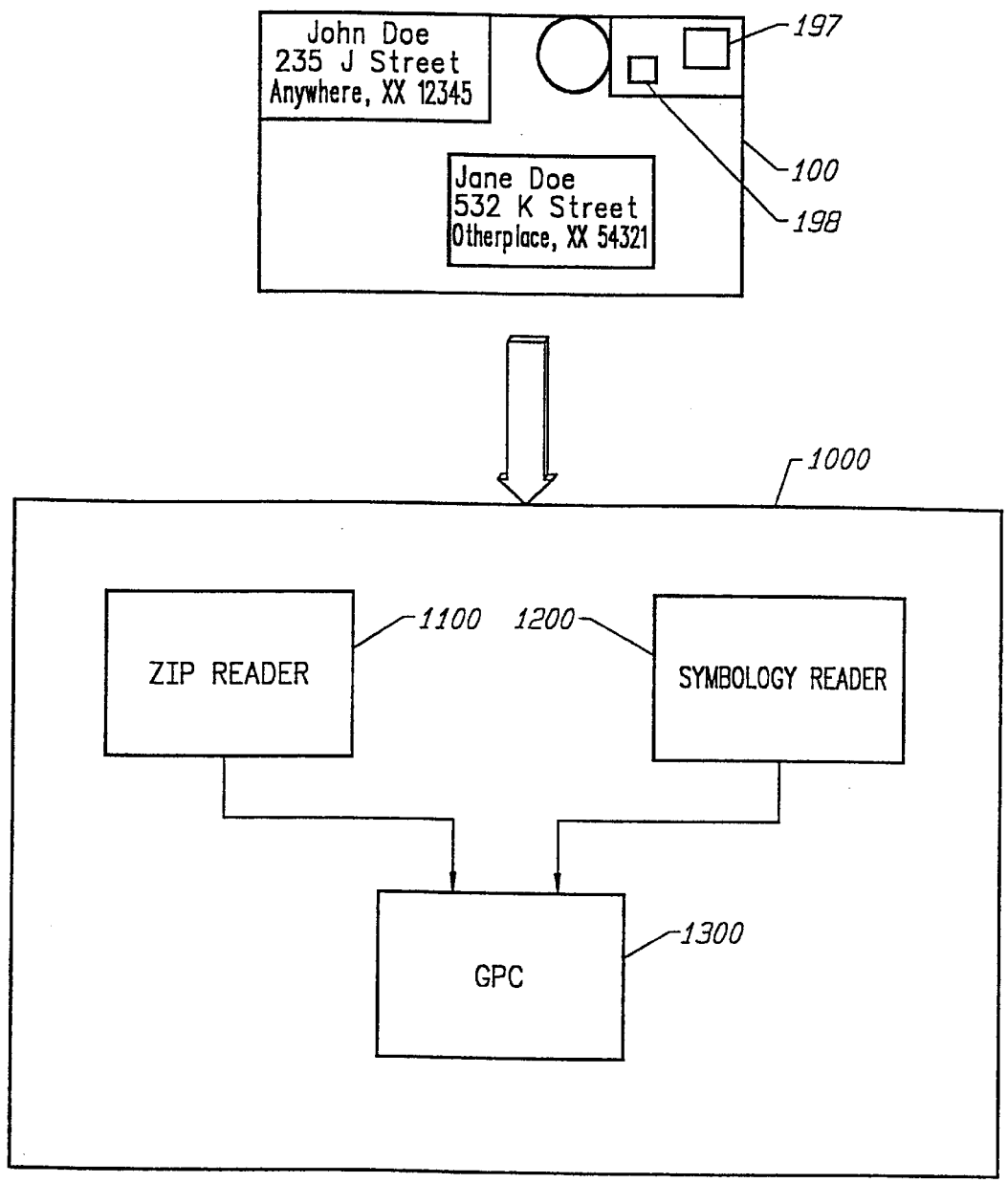
FIG. 9 is a diagram showing an auditing system for preventing the printing of fraudulent postage indicia.

An authentication system 1000 for the detection of fraudulent postage indicia is shown in FIG. 9. ZIP reader 1100 reads human-readable postage information 197 and symbology reader 1200 reads encoded postage information 198. This information is passed to GPC 1300, where software (not shown) residing on GPC 1300 decodes, then (if required) decrypts encoded postage information 198. The software then compares this decoded information to human-readable postage information 197 and indicates whether or not the postage indicium is authentic. Other information may be provided by the user to aid in the authentication of the postage indicium. Aside from the advantage of small area, this method can also provide two levels of security. First, decoding a data matrix requires special software or at least an understanding of the techniques involved. Second, even if the data matrix is captured and decoded, encryption can be used to prevent viewing of any or all the data. Thus, this system meets the requirement for a secure, accurate means of authenticating postage indicia.

Moreover, while the invention has been particularly shown and described with reference to these specific embodiments, it will be understood by those skilled in the art that the foregoing and other changes in the form and details may be made therein without departing from the spirit or scope of the invention. For example, the present invention should not be limited by any one placement or connection of the SMD in the postage metering system. There may be one or many SMDS, each storing postage information for any number of user sites. Such sites may be local, or remote and widely dispersed geographically. Consequently, the scope of the invention should be determined with reference to the appended claims.

What is claimed is:

1. A modular postage accounting system for generating and printing secure postage indicia, comprising:
    a computer having a first I/O port, a second I/O port, and a third I/O port;
    a printer having a first printer port, said first printer port operatively coupled to said first I/O port for printing secure postage indicia and other information from said computer;
    a modem having a first modem port and a second modem port, wherein said first modem port is operatively coupled to a telephone line and said second modem port is operatively coupled to said second I/O port;
    a secure metering device having:
        a first communications port operatively coupled to said third I/O port, wherein said first communication port is configured to communicate postage information between said secure metering device and said computer;
        storage means configured to redundantly and securely store said postage information,
        secure communication means configured to securely communicate with said computer, and
        first computing means coupled to said storage means and coupled to said secure communication means, wherein said first computing means is configured to control said storage means and transfer said postage information from said storage means to said secure communication means;
    first automated reading means configured to read human-readable information from said secure postage indicia;
    second automated reading means configured to read encoded postage information from said secure postage indicia; and
    second computing means coupled to said first automated reading means and coupled to said second automated reading means, wherein said second computing means is configured to compare said human-readable information and said encoded postage information to determine the authenticity of said secure postage indicia.

2. The system of claim 1, further comprising software residing on said computer for controlling said I/O ports and the devices attached thereto.

3. The system of claim 1, wherein said secure communication means includes wireless communications means configured to operatively couple said secure metering device and said computer.

4. The system of claim 3, wherein said wireless communications means is configured to provide communications between said first communication port and said third I/O port.

5. The system of claim 3, wherein said wireless communications means is configured to communicate said postage information to said computer.

6. The system of claim 3, wherein said wireless communications means is configured to transmit at least one control signal from said computer to said secure metering device.

7. The system of claim 6, wherein said computer is configured to control said secure metering device via said control signal.

8. The system of claim 7, wherein said secure metering device is configured to generate said postage information in response to said control signal.

9. The system of claim 1, wherein said secure communication means includes a wireless communication link.

10. The system of claim 1, wherein said postage information includes said secure postage indicia.

11. A modular postage accounting system for generating secure postage indicia, comprising:
    a computer having a first I/O port, a second I/O port, and a third I/O port;
    a printer having a first printer port, wherein:
        said first printer port is coupled to said first I/O port, and
        said printer is configured to print secure postage indicia and other information transmitted from said computer to said printer;
    a modem having a first modem port and a second modem port, wherein said first modem port is coupled to a telephone line and said second modem port is coupled to said second I/O port;
    a secure metering device including:
        a first communication port coupled to said third I/O port, wherein said first communication port is configured to communicate postage information between said secure metering device and said computer;

a first battery augmented memory unit for storing the postage information;

a second battery augmented memory unit for storing the postage information;

a memory controller coupled to said first battery augmented memory unit and said second battery augmented memory unit;

a microprocessor, coupled to said memory controller, for updating the postage information stored in said first battery augmented memory unit and said second battery augmented memory unit and communicating the information held in said first battery augmented memory unit and said second battery augmented memory unit;

a memory unit, coupled to said microprocessor, for storing information required by said microprocessor; and a secure communications port, coupled to said microprocessor and coupled to said memory controller, for allowing the microprocessor to securely communicate with said computer and for allowing said computer to access said first battery augmented memory unit and said second battery augmented memory unit via said memory controller;

first automated reading means configured to read human-readable information from said secure postage indicia;

second automated reading means configured to read encoded postage information from said secure postage indicia; and computing means coupled to said first automated reading means and coupled to said second automated reading means, wherein said computing means is configured to compare said human-readable information and said encoded postage information to determine the authenticity of said secure postage indicia.

entering a request onto a general purpose computer (GPC) to print a postage indicium on a mail piece;

transmitting the request via a secure wireless communications link from the GPC to a secure metering device (SMD);

generating data representing the postage indicium in the SMD; and printing the postage indicium on a mail piece, wherein the postage indicium is configured to permit authentication of the postage indicium using encoded information included therein.

12. The system of claim 11, further comprising a secure communications link configured to operatively couple said secure metering device and said computer.

13. The system of claim 12, wherein said secure communications link includes a wireless communications link configured to operatively couple said secure metering device and said computer.

14. The system of claim 13, wherein said wireless communication link is configured to operatively couple said first communication port and said third I/O port.

15. The system of claim 13, wherein said wireless communications link is configured to communicate said postage information to said computer.

16. The system of claim 13, wherein said wireless communications link is configured to transmit at least one control signal from said computer to said secure metering device.

17. The system of claim 16, wherein said computer is configured to control said secure metering device via said control signal.

18. The system of claim 17, wherein said secure metering device is configured to generate said postage information in response to said control signal.

19. The system of claim 13, wherein said postage information includes said secure postage indicia.

* * * * *